G. T. PARRY.
Water Gage.
No. 64,025.            Patented April 23, 1867.
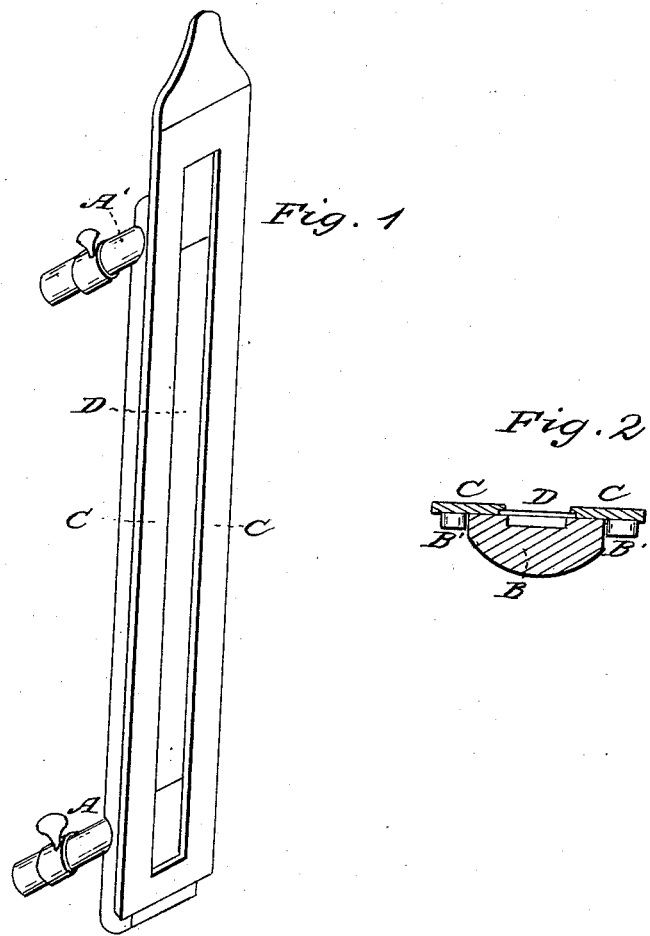
Witnesses:
C. F. Clausen
D. P. Holloway
Inventor:
Geo. T. Parry
By D. P. Holloway & Co
Attys.

United States Patent Office.

GEORGE T. PARRY, OF PHILADELPHIA, PENNSYLVANIA.

Letters Patent No. 64,025, dated April 23, 1867.

IMPROVEMENT IN STEAM GENERATOR WATER-GAUGES.

The Schedule referred to in these Letters Patent and making part of the same.

TO ALL WHOM IT MAY CONCERN:

Be it known that I, GEORGE T. PARRY, of the city and county of Philadelphia, and State of Pennsylvania, have invented a new and improved Water-Gauge for Boilers; and I do hereby declare that the following is a full, clear, and exact description of the same, reference being had to the annexed drawings, making part of this specification, in which—

Figure 1 is a perspective view; and

Figure 2 is a horizontal section.

The same letters are employed in both figures in the indication of identical parts.

The object of this invention is to provide a cheap and simple gauge for determining the height of the water in steam generators by inspection.

The gauge is attached to the boiler-head by a pipe, A, entering the boiler below the low-water line, and by a pipe, A', entering it above the high-water line. It is composed of a frame in two pieces, B and C, and a glass plate, D. The piece B is the back of the gauge. It is semicircular in external form, with lugs, B', for receiving the screws by which the front frame C is attached to it. The glass D is enclosed between the plates B and C, which are fitted to one another and to the glass plate with steam-tight joints. The chamber between the piece B and the glass plate is so constructed that steam and water shall be presented in a thin sheet, by which agitation is diminished as well as the formation of deposits. The height of the water will thus always be seen through the transparent plate in front of the gauge. The front frame C projecting beyond the face of the glass plate, the latter is protected from external injury. These, with the cheapness of construction and application, and ready facility for cleaning the glass by removing it from the gauge, are claimed to be the advantages of this gauge over others in use.

What I claim as my invention, and desire to secure by Letters Patent, is—

The construction and arrangement of the plates B C and D, whereby the water is shown in a thin sheet, substantially as set forth.

In testimony whereof I have signed my name to this specification in the presence of two subscribing witnesses.

GEORGE T. PARRY.

Witnesses:
GEO. B. MILLER,
EDGAR L. THOMSON.